July 6, 1948. G. F. RACKETT 2,444,785
CONTINUOUS DRUM PRINTER FOR MOTION PICTURES
Filed Nov. 2, 1945 3 Sheets-Sheet 2

Inventor
Gerald F. Rackett,
by Roberts Cushman & Grover
his Attys.

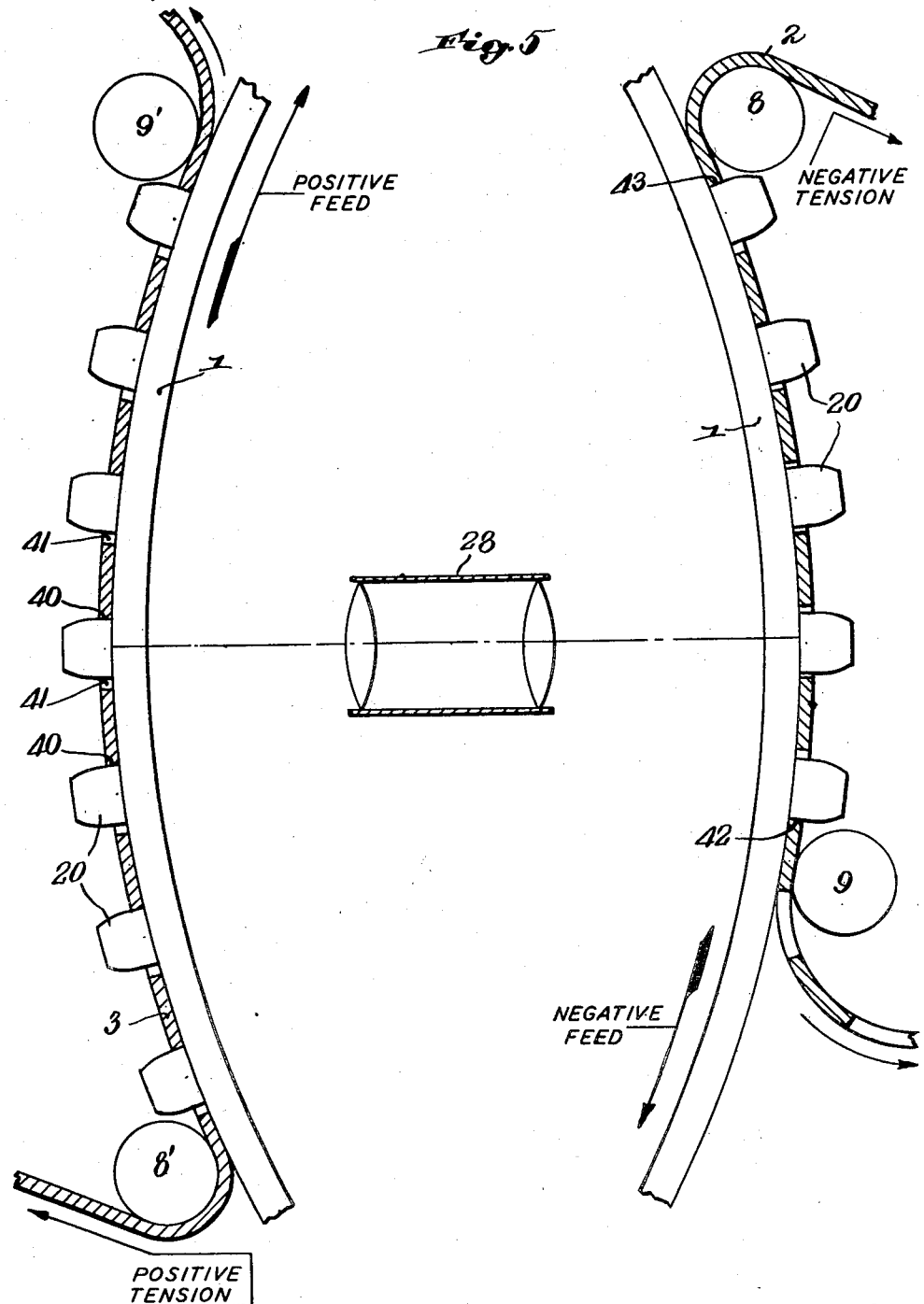

Patented July 6, 1948

2,444,785

UNITED STATES PATENT OFFICE 2,444,785

CONTINUOUS DRUM PRINTER FOR MOTION PICTURES

Gerald F. Rackett, Los Angeles, Calif., assignor to Technicolor Motion Picture Corporation, Hollywood, Calif., a corporation of Maine Application November 2, 1945, Serial No. 626,265

4 Claims. (Cl. 88—24)

This invention relates to projecting printers and more particularly to apparatus for continuously printing a sound-track from one motion picture film to another, as for example from a negative film to a positive film which is to be used as a printing matrix in an imbibition process or other mechanical printing process.

Objects of the invention are to provide projection printing apparatus which prints images sharply and evenly, which requires only a simple optical system, which may be used to print edge numbers along with a sound track, which is simple and inexpensive to manufacture, which is adjustable to different films shrunk to different degrees respectively, and generally to improve the art to which the present invention relates.

In one aspect the present invention involves a cinematographic printer comprising a carrier traveling in an orbital path (such as a drum as herein disclosed or an endless belt as disclosed in copending application Serial No. 626,266, filed on even date herewith), the carrier having a succession of register teeth projecting outside the orbit for engagement in the sprocket holes of film, together with an optical printing system having its optical axis intersecting the orbital path at opposed points in the orbit, means for feeding films to the outer side of the carrier in advance of the aforesaid points respectively, and means for feeding the films from the carrier beyond the points respectively, whereby images may be printed on one film by projecting records across the orbit from the other film. The optical system includes a copying lens inside the orbit, and longitudinal zones of the films are left uncovered by the carrier to permit the projection of images across the orbit from one film to the other as aforesaid.

In a more specific aspect the invention involves printing apparatus which comprises means for guiding two films in opposite directions along two opposing substantially coaxial arcs (such as the opposite sides of a single drum) with one margin of each film projecting from one edge of the drum across a diametrical optical axis (such as an axis extending along a diameter of the aforesaid drum), together with optical means including a copying lens in the aforesaid axis between the two films for continuously printing a sound track from one film to the other.

When using a single drum as the aforesaid rotary means the drum is provided with an annular row of sprocket teeth to engage in the sprocket holes along one edge of each film, with the opposite margin of each film projecting beyond the edge of the drum across the optical axis, thereby accurately to position the films in relation to the optical axis. For holding each film against the drum throughout an arc of predetermined length an ordinary film roller may be provided at each end of each arc. In order to print satisfactorily from a film which has been shrunk as the result of alternate wetting and drying, such as a developed negative, to an unshrunken film, such as fresh positive stock, the invention includes means for compensating for such shrinkage so that the shrunken film is not damaged by the sprocket teeth and at the same time the film is always precisely positioned by the sprocket teeth so that it feeds smoothly and continuously at all times. For this purpose the film roller at one end of one of said arcs, preferably the one at the leading end of the negative arc, is adjustable lengthwise of the arc, that is, circumferentially of the drum, so that the length of the arc may be varied in accordance with the degree of shrinkage of any negative to be printed.

For the purpose of illustration a typical embodiment of the invention is shown in the accompanying drawings in which Fig. 1 is a diagram illustrating the general arrangement of parts;

Fig. 5 is an enlarged detail view of the parts of the apparatus adjacent the optical axis, showing a portion of each of the two films in section.

Figure 1:
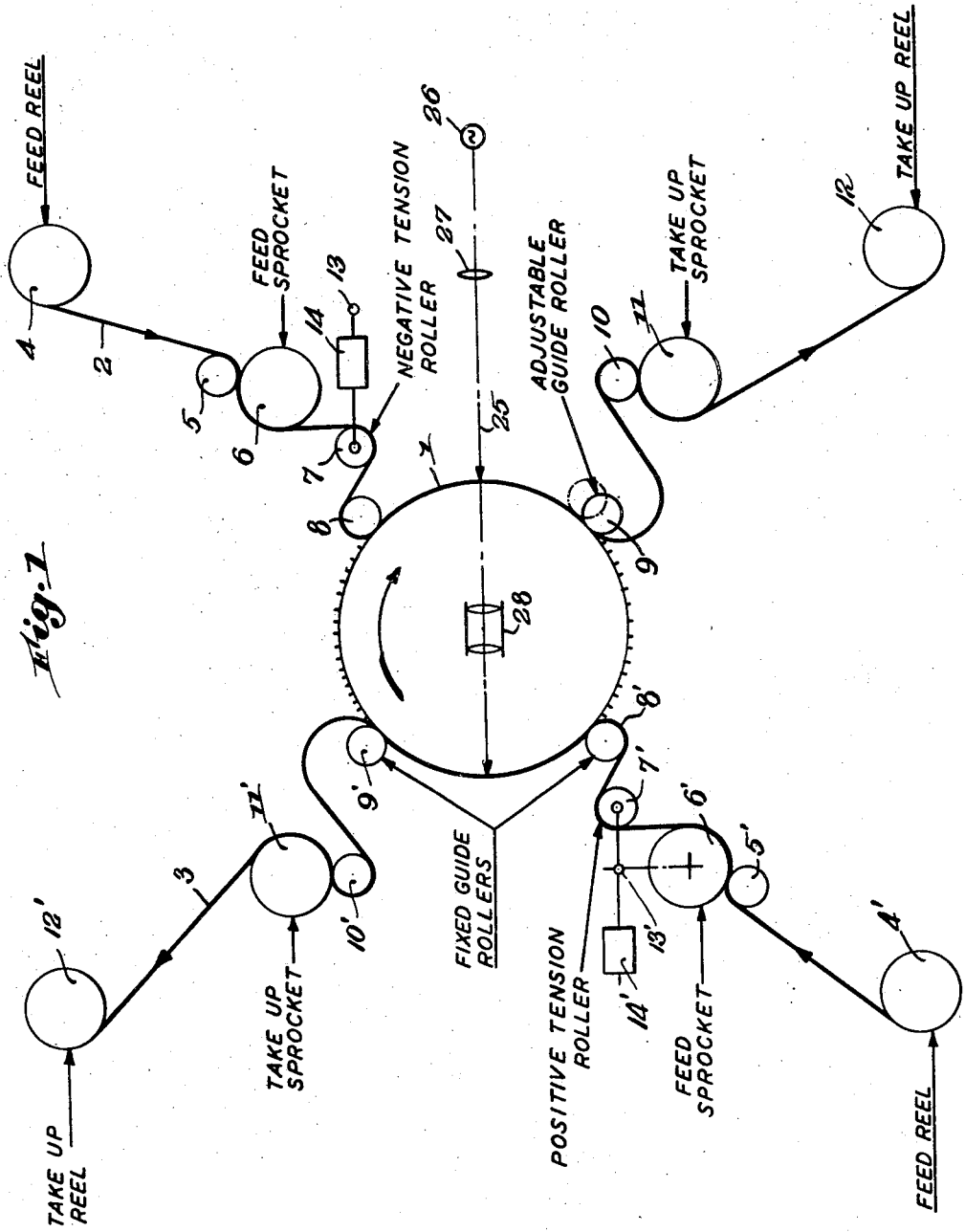

The particular embodiment of the invention chosen for the purpose of illustration comprises a drum I over which two films, such as a negative 2 and a positive 3, may be fed along opposite sides of the drum. As shown in Fig. 1 the negative film is fed from a feed reel 4 under a guide roller 5 over a sprocket wheel 6, under a tensioning roller 7 over a feeding roll 8, to the drum I, under a guide roll 9 and thence between a roll 10 and sprocket wheel 11 to a take-up reel 12. The tension roller 7 is pivotally mounted to swing about an axis 13 and is weighted as indicated at 14 to exert a predetermined degree of tension on the negative film 2 as it feeds on the drum 1. The positive film 3 is similarly fed along the opposite side of the drum I by similar mechanism which is correspondingly designated in the drawings. The roller 9 is adjustable circumferentially of the drum by any suitable means as by a swinging arm coaxial with the drum on one or each side of the drum.

Figure 2:
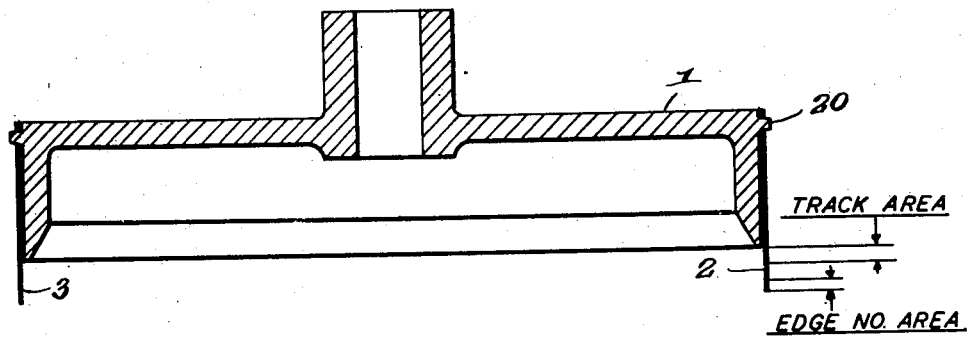
Fig. 2 is an axial section of the printing drum.

As shown in Fig. 2 the drum 1 is provided with an annular row of sprocket teeth 20 for engagement in one row of sprocket holes of each film, the drum being somewhat narrower than the film so that the sound track margin of the film projects beyond the edge of the drum across the aforesaid optical axis which extends along a diameter of the drum 1 as indicated at 25 in Fig. 1. Located in this optical axis are the usual optical elements employed in projection printing, including a light source 26, a condensing lens 27 and a copying lens 28, the latter being centered on the axis of the drum 1 for a printing ratio of 1 to 1.

Figure 3:
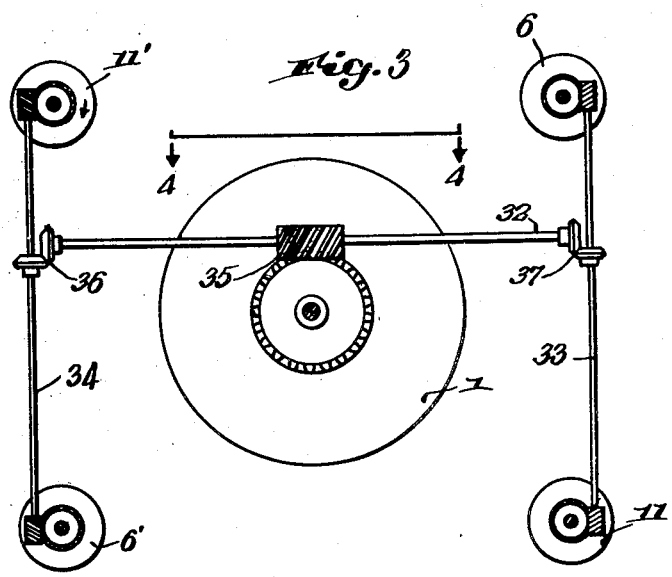
Fig. 3 is a rear view of the train of mechansm for driving the drum and sprocket wheels.
Figure 4:
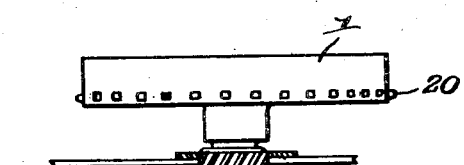
Fig. 4 is a view from the line 4—4 of Fig. 3.

As shown in Figs. 3 and 4 the drum 1 may be driven from any suitable source of power 30, preferably through a mechanical filter as indicated at 31. Each of the four sprocket wheels 6, 6', 11 and 11' are positively driven in synchronism with the drum 1 through any suitable train of mechanism such as the shafts 32, 33 and 34 and the gears 35, 36 and 37. By driving the drum through a mechanical filter modulation of the printed sound-track by gear of film sprocket meshings may be reduced to a negligible level. By positively driving the film at each end of the arcs of contact with the drum, by feed sprockets 6—11 and 6' to 11', with loops between the drum and sprocket wheels, the portions of the films associated with the drum 1 are not influenced by the take-up and feed reel tension. By inserting the tension rollers 7 and 7' with the loops of film immediately in advance of the arcs of contact with the drum the leading edges of the sprocket holes of the film are drawn back against the sprocket teeth on the drum with uniform tension.

As shown at the left-hand side of Fig. 5 the sprocket teeth 20 are made somewhat smaller than the standard perforations of unshrunken positive stock in the dimension corresponding to the lengthwise dimension of the film. Thus with the pitch of the sprocket teeth being equal to the pitch of the perforations the tension roller 7' would draw the leading edges of the sprocket holes back against the leading sides of the sprocket teeth as indicated at 40, leaving uniform clearance 41 between the trailing edges of the sprocket holes and the trailing sides of the sprocket teeth throughout the entire arc of contact of the positive film with the drum. However with a shrunken film, such as the negative film 2 illustrated at the right-hand side of Fig. 5, the clearance between the edges of the sprocket holes and the sides of the drum teeth would vary throughout the arc of contact between the film and the drum. As shown in Fig. 5 the roller 9 is adjusted to that position in which the leading side of the tooth approaching the roller engages the leading edge of its sprocket hole as indicated at 42 and the trailing side of the tooth at the other end of the arc engages the trailing edge of its sprocket hole as indicated at 42. Thus, with film shrunken to the extent indicated, the arc between rollers 8 and 9 is adjusted to the maximum length which will accommodate this particular film without tearing or distorting the film. For example, if the arc were lengthened to permit six teeth instead of five to mesh with the film simultaneously, the distance between the leading edge of the first sprocket hole and the trailing edge of the last sprocket hole would be less than the distance between the leading side of the first tooth and the trailing side of the last tooth in the arc, and the film would be torn or distorted. Thus roller 9 is adjusted circumferentially of the drum so that the distance between the leading side of the first tooth and the trailing side of the last tooth of the arc is equal to or less than the corresponding length of the shrunken film. Preferably the arc is adjusted to the maximum length permissible with the particular negative to be printed.

As each film is fed to and from the drum 1 there is some slippage between the drum and the film lengthwise of the film, particularly in the case of shrunken film. Inasmuch as this slippage is more or less intermittent and irregular instead of being smooth and continuous, it tends to create a lengthwise vibration of the film which is known as film flutter. However I have found that by seating each film on the drum well in advance of the optical axis and then not removing the film from the drum until well past the optical axis, this flutter is not transmitted through the film as far as the portion of the film in the optical axis. Thus the portion of the film crossing the optical axis at any moment is traveling continuously and steadily. Consequently the records may be printed without the usual distortion resulting from film flutter.

It should be understood that the present disclosure is for the purpose of illustration only and that this invention includes all modifications and equivalents which fall within the scope of the appended claims.

I claim:

1. Apparatus for printing sound tracks on motion picture film comprising a rotary drum having sprocket teeth for positioning the film with one margin projecting beyond the edge of the drum, means for feeding two films in opposite directions along opposite sides of the drum with the films contacting the drum throughout predetermined arcs and with corresponding margins projecting across a diametrical optical axis, means for adjusting the length of one of said arcs to compensate for film shrinkage, and means for continuously printing a sound track from one film to the other film including a copying lens in said axis between the two films.

2. Apparatus for printing sound tracks on motion picture film comprising a rotary drum having sprocket teeth for positioning the film with one margin projecting beyond the edge of the drum, means for feeding two films in opposite directions along opposite sides of the drum with the films contacting the drum throughout predetermined arcs and with corresponding margins projecting across a diametrical optical axis, said means including a roller adjacent the drum at each end of each of said arcs, means for adjusting one of said rollers circumferentially of the drum, and means for continuously printing a sound track from one film to the other film including a copying lens in said axis between the two films.

3. Apparatus for printing sound tracks on motion picture film comprising a rotary drum having sprocket teeth for positioning the film with one margin projecting beyond the edge of the drum, means for feeding two films in opposite directions along opposite sides of the drum with the films contacting the drum throughout predetermined arcs and with corresponding margins projecting across a diametrical optical axis, said means including a sprocket wheel and a guide roller at each end of each of said arcs, each roller being adjacent the drum and its associated wheel being spaced from the drum along the film path with a loop of film therebetween, an automatic tension device associated with that loop of each film which is in advance of the drum, means for adjusting the length of one of said arcs, means for driving the sprocket wheels and drum in synchronism, and means for continuously printing a sound track from one film to the other film including a copying lens in said axis between the two films.

4. Apparatus for printing sound tracks on motion picture film comprising a rotary drum having sprocket teeth for positioning the film with one margin projecting beyond the edge of the drum, means for feeding two films in opposite directions along opposite sides of the drum with the films contacting the drum throughout predetermined arcs and with corresponding margins projecting across a diametrical optical axis, means for adjusting the length of one of said arcs, a mechanical filter between the drive means and drum, and means for continuously printing a sound track from one film to the other film including a copying lens in said axis between the two films.

GERALD F. RACKETT.

REFERENCES CITED

The following references are of record in the file of this patent:

UNITED STATES PATENTS

| Number | Name | Date |
| --- | --- | --- |
| 1,584,185 | Mitchell | May 11, 1926 |
| 1,783,045 | Kellogg | Nov. 25, 1930 |
| 1,993,085 | Carpenter | Mar. 5, 1935 |
| 2,032,397 | Brady | Mar. 3, 1936 |
| 2,106,338 | Black | Jan. 25, 1938 |
| 2,200,086 | Kellogg | May 7, 1940 |
| 2,235,907 | Tondreau | Mar. 25, 1941 |
| 2,271,572 | Rackett | Feb. 3, 1942 |
| 2,240,083 | Tondreau | Apr. 29, 1941 |